Patented Jan. 25, 1949

2,460,188

UNITED STATES PATENT OFFICE 2,460,188

FUNGICIDAL COMPOSITIONS

Walter C. O'Kane, Durham, N. H., and Glen H. Morey, Terre Haute, Ind., assignors to Commercial Solvents Corporation, Terre Haute, Ind., a corporation of Maryland No Drawing. Application May 2, 1945, Serial No. 591,632

7 Claims. (Cl. 167—33)

This invention relates to fungicidal compositions and more particularly to such compositions comprising divalent heavy metal complexes of kojic acid prepared from metals having specific gravities from 7 to 14 inclusive.

In combating the attacks on living plants of parasitic fungi, it has been the practice in the past to treat the plants with so-called fungicides, of which one of the most effective and widely used has been so-called Bordeaux mixture which is a mixture of copper sulfate, lime, and water.

Bordeaux mixture, while cheap and of wide general effectiveness in this field, has a number of disadvantages. Bordeaux mixture although it is a smooth colloidal material when freshly prepared tends to form lumpy pasty solutions when prepared from commercial concentrates which do not suspend well in liquids and which are difficult to apply uniformly to obtain good coverage, and, moreover, this lumping tendency makes it difficult or impracticable to apply the Bordeaux by means of fine sprays because of the resulting clogging of the atomizers. Furthermore, although Bordeaux usually contains an excess of lime, nevertheless it is somewhat injurious to certain plant foliage, particularly in wet weather, since, under the influence of rain or moisture on the mixture, the copper ion is released too rapidly, and causes burning of the plant.

We have now found that the heavy divalent metal complexes of kojic acid prepared from metals having specific gravities from 7 to 14 inclusive not only possess excellent fungicidal properties against parasitic fungi which attack living plants, but also that these complexes are susceptible to extremely fine suspension in carrying liquids which makes for good coverage and easy application to the plant by spray or other means. Furthermore, the complexes are substantially without injury to plant foliage in their effective fungicidal concentrations and, accordingly, are safer for the plant. Moreover, since the metal radical is bound in the complex in non-ionizable form, the complexes are much less toxic to humans and are safer to handle and to apply than is Bordeaux mixture.

The metal complexes utilizable as fungicides in our invention are those formed from divalent heavy metals having specific gravities from 7 to 14 inclusive and these complexes include those from the metals copper, tin, lead, mercury, zinc, cadmium, manganese, iron, nickel and cobalt.

The precise structure of the metal kojate complexes is not known, but from a determination of magnetic susceptibility measurements the structure given below has been proposed:

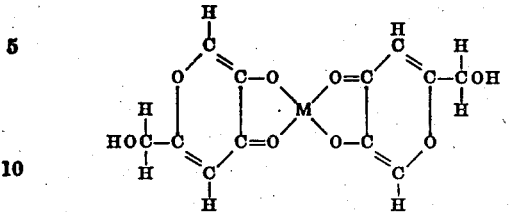

in which M is a divalent heavy metal.

The metal complexes of kojic acid described may be readily prepared by mixing the aqueous solutions of the salts of the respective divalent heavy metals with an alkali kojate such as sodium kojate. The metal complexes are formed immediately. They are insoluble in water and precipitate out, and may be recovered by simple filtration or they may be utilized in the original suspension if desired.

The term "complex" as used throughout the specification and claims is used to denote the reaction products of kojic acid and the divalent metals described above, formed as described whatever the structure of the resulting compounds may be.

We have found that the heavy metal kojates described are effective fungicides against fungi of the parasitic type which attack living plants, and that they are especially useful in controlling early blight of potatoes and tomatoes (*Alternaria solani*), late blight of potatoes and tomatoes (*Phytophthora infestans*), snapdragon rust (*Puccinia anterrhini*), brown rot (*Sclerotina fructicola*), apple scab (*Venturia inaequalis*) and the like.

The amount of metal kojate necessary to control the different fungus diseases of different plants varies with the complex, the fungus and the plant, some of the complexes being somewhat more effective against particular fungi than others. However, the quantities required to be applied according to the standard application methods referred to hereinafter are relatively small, and well in line with the quantities required of many of the fungicides currently in use. In general, quantities ranging from a fraction of a percent to 10% or so of the metallic complex suspended in water or other carrier, are usually sufficient to give effective disease control when applied to the plant as a spray.

The metal complexes are solids which are readily prepared in finely divided form and suspend easily in liquids, and accordingly, are advantageously applied by spray in the form of their water or other liquid suspension. They can also be applied as dusts either alone or mixed with diluting solid carriers as desired. The complexes "cover" well and adhere firmly to the foliage.

The metal complexes may be used individually as certain of the metal kojic complexes described have particular effectiveness against particular fungi, or they may be mixed and applied to the plants as a mixture.

In order to illustrate the application of our invention with respect to a few representative fungi the following tests are given as exemplary.

EXAMPLE I

Greenhouse tests were made in which individual suspensions of the copper, zinc, tin, and mercury complexes of kojic acid were suspended in water each to give a series of suspensions varying in concentration from fractions of a percent up to several percent or more. Tomato plants were sprayed by placing the plant on a turntable in front of a spray gun, and rotating the plant at a predetermined known rate until all the foliage had been sprayed. After drying, the treated plants and others which had not been treated, were inoculated with a spore suspension containing a large number of spores of the indicated plant disease. The inoculated plants, both treated and untreated, were then immediately placed in high humidity chambers suitable for infection to take place. Twenty-four hours later the plants were removed to a greenhouse. After a period of several days, disease lesions or spots began to appear on some of the leaves. The numbers on a given number of leaves were counted and expressed as percentage of the number from the comparable unsprayed check plants. The dosage required to reduce the number of spots on a plant 95%, that is, to protect the plant so that it has only 5% disease spots is referred to in percent as LD (lethal dose) 95.

The LD 95 values of the metal kojates listed above as determined by the test described against the indicated fungus diseases are listed below.

*Per cent of metal kojate in water to give 95% disease control*

| Kojate | Early blight (*Alternaria solani*) | Late blight (*Phytophthora infestans*) | Snapdragon Rust (*Puccini anterrhini*) |
|---|---|---|---|
| Copper | 1.1 | 0.52 | 1.0 |
| Zinc | 10. | 10.0 | 1.0 |
| Tin | 4.2 | 10.0 | 0.30 |
| Mercury | 1.0 | 10.0 | 1.0 |
| Lead | 1.0 | 1.0 | 0.33 |
| Bordeaux mixture (control) | 7 | 0.1 | >10 |

It will be observed that all the heavy metal complexes described are effective to some extent against all the diseases tested, and all are considerably more effective against snapdragon rust than is Bordeaux mixture. All, except the zinc complex, are superior to Bordeaux against early blight. As to the late blight, only the copper complex is effective in doses in the range of effectiveness of the Bordeaux mixture although all are effective at somewhat higher concentrations. The tin complex, on the other hand, exhibits particularly effective control of snapdragon rust in extremely small doses.

EXAMPLE II

Spore tests were made in which individual suspensions in water of copper, zinc, tin, mercury, cadmium, and manganese kojates were prepared. A series of dilutions of each was made so that the concentration of each dilution differed by 3.16 fold, i. e., $\sqrt{10}$ from the preceding one. Constant portions drawn from a uniform suspension of the spores to be tested were added to each dilution. Drops of the kojate and spore suspension mixture were pipetted on to glass slides and held under favorable conditions for the germination of untreated spores. After 20 hours, 100 spores were counted from each dilution and recorded as germinated or ungerminated. The results expressed as percentage ungerminated are plotted on logarithmic probability paper and a straight line drawn among the points. The concentration in parts per million of the kojate at which 50% of the spores failed to germinate was read from the graph and recorded as the LD50. The concentration at which 95% of the spores failed to germinate was read from the graph and recorded as the LD95. The results of the spore tests using the fungi *Sclerotinia fructicola* and *Alternaria solani* with the kojates listed are given in the table below. The standard used as a control was Bordeaux mixture in which the LD50 in parts per million calculated as copper is approximately 1 to 10.

*Insecticidal activity of metal kojic acid complexes*

| Metal Complex | Parts per Million for LD-50 of Spores of | |
|---|---|---|
| | *Sclerotinia fructicola* (Brown Rot) | *Alternaria Solani* (Early Blight) |
| Copper | 320 | 400 |
| Zinc | >3,000 | >3,000 |
| Tin | >1,000 | 240 |
| Mercury | >1,000 | >1,000 |
| Cadmium | 2.7 | 14 |
| Manganese | >10,000 | >10,000 |
| Bordeaux mixture (P. P. M. Cu.) | 1-10 | 1-10 |

EXAMPLE III

Spore tests were run as described under Example II of the copper, iron, cobalt and nickel complexes of kojic acid with the results given in the table below. The same Bordeaux mixture described under Example II was used as the standard control.

*Insecticidal activity of metal kojic acid complexes*

| Metal Complex | Parts per Million for LD-50 and LD-95 of Spores | | | |
|---|---|---|---|---|
| | *Sclerotinia fructicola* (Brown Rot) | | *Venturia inaequalis* (Apple Scab) | |
| | LD-50 | LD-95 | LD-50 | LD-95 |
| Copper | 50 | 280 | 80 | 300 |
| Iron | 250 | 2,000 | 130 | 1,700 |
| Cobalt | 90 | 320 | 5,000 | 10,000 |
| Nickel | 50 | 260 | 60 | 240 |
| Bordeaux mixture (P. P. M. Cu) | 1-10 | 10-100 | 1-10 | 10-100 |

Having described our invention, what we claim is:

1. A method for suppressing parasitic fungus growths on living plants which comprises bringing into contact therewith a kojic acid salt of a divalent heavy metal, said heavy metal having a specific gravity between 7 and 14.

2. A parasitic fungicidal composition containing as an essential active ingredient the lead complex of kojic acid in a form susceptible of extremely fine suspensions, and a carrier therefor.

3. A parasitic fungicidal composition containing as an essential active ingredient the cadmium complex of kojic acid in a form susceptible of extremely fine suspensions and a carrier therefor.

4. A method for suppressing the growth of parasitic fungi on living plants which comprises bringing into contact therewith the copper complex of kojic acid.

5. A method for suppressing the growth of parasitic fungi on living plants which comprises bringing into contact therewith the lead complex of kojic acid.

6. A method for suppressing the growth of parasitic fungi on living plants which comprises bringing into contact therewith the cadmium complex of kojic acid.

7. A method for suppressing the growth of parasitic fungi on living plants which comprises spraying said plants with a suspension in water of a divalent heavy metal complex salt of kojic acid, said heavy metal having a specific gravity between 7 and 14.

WALTER C. O'KANE.
GLEN H. MOREY.

REFERENCES CITED

The following references are of record in the file of this patent:

UNITED STATES PATENTS

| Number | Name | Date |
|---|---|---|
| 2,208,253 | Flenner | July 6, 1940 |

OTHER REFERENCES

Friedemann, Chemical Abstracts, vol. 28, 1934, page 5836.

Yabuta, Chemical Abstracts, vol. 17, 1923, pages 1475–1476.

Jennings, Nature, March 10, 1945, page 302.

Barham et al., Trans. Kansas Acad. of Sciences, vol. 37, 1933, pages 91, 94, and 95.

Wiley, Chemical Abstracts, vol. 36, 1942, page 3114.